Aug. 17, 1965    H. J. WOOLSLAYER ETAL    3,201,091

PORTABLE OIL WELL DRILLING APPARATUS

Original Filed Dec. 9, 1960    4 Sheets-Sheet 1

INVENTORS.
HOMER J. WOOLSLAYER
CECIL JENKINS
BY
Brown, Critchlow, Flick & Peckham.
ATTORNEYS.

INVENTORS.
HOMER J. WOOLSLAYER
CECIL JENKINS
BY
Brown, Critchlow,
Flick & Peckham.
ATTORNEYS

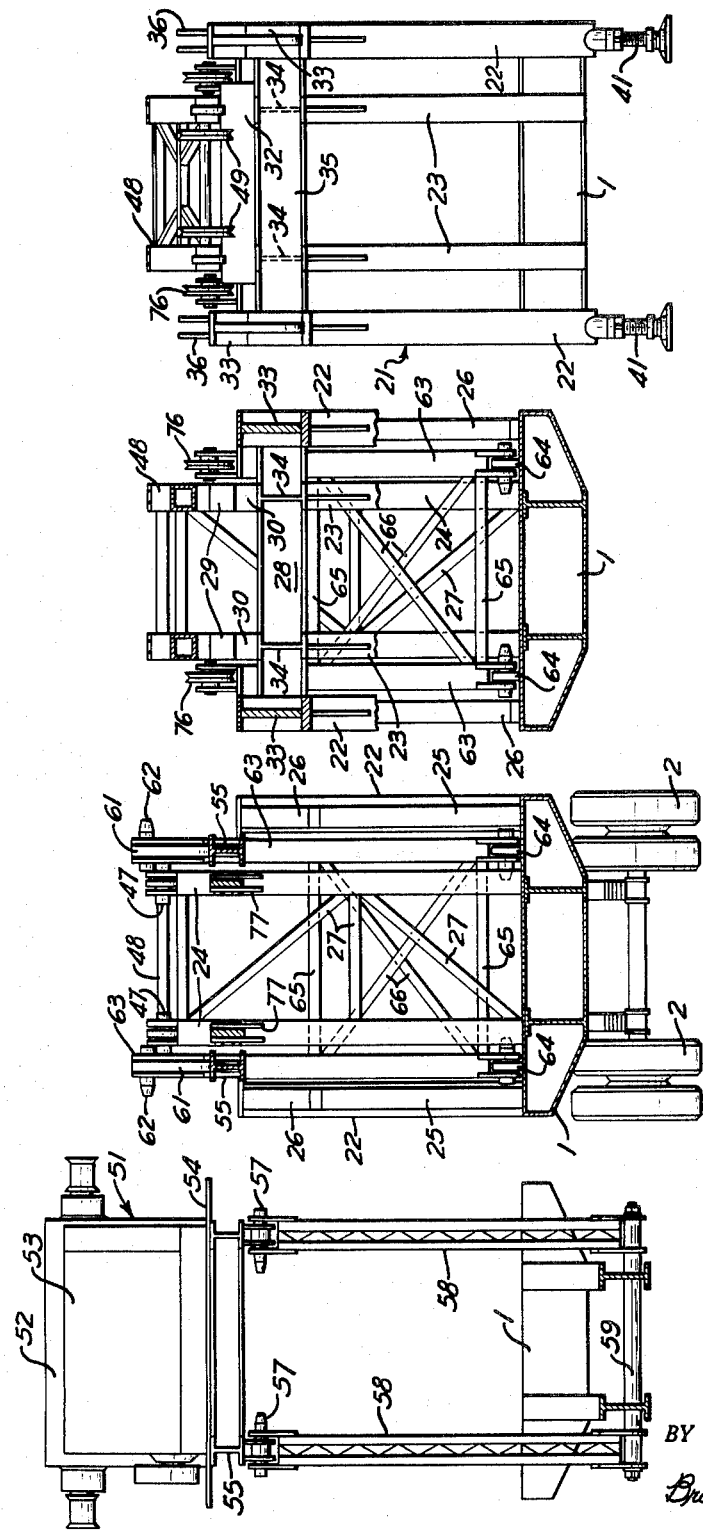

INVENTORS.
HOMER J. WOOLSLAYER
CECIL JENKINS
BY
Brown, Critchlow, Flick & Peckham.
ATTORNEYS.

United States Patent Office 3,201,091
Patented Aug. 17, 1965

3,201,091
PORTABLE OIL WELL DRILLING APPARATUS
Homer J. Woolslayer and Cecil Jenkins, Tulsa, Okla., assignors to Lee C. Moore Corporation, Pittsburgh, Pa., a corporation of Pennsylvania
Original application Dec. 9, 1960, Ser. No. 74,869, now Patent No. 3,136,394, dated June 9, 1964. Divided and this application Oct. 4, 1963, Ser. No. 313,947
3 Claims. (Cl. 254—139.1)

This application is a division of our copending patent application, Serial Number 74,869, filed Dec. 9, 1960, now Patent Number 3,136,394.

This invention relates to trailer mounted oil well drilling equipment, and more particularly to means for transporting the equipment and setting it up for operation.

Trailer mounted oil well drilling masts are becoming more and more popular because it is so much easier and cheaper to erect them, take them down and carry them to new locations than to use trucks and trailers merely as transportation vehicles, from which the masts have to be unloaded at every drilling site. It also is desirable to carry the drawworks on the same trailer as a mast, but heretofore the drawworks has been permanently mounted at a low level on the trailer, which is undesirable because it limits the distance the rotary table can be spaced from the ground. Moreover, as the masts become taller and the drawworks heavier, the trailer loads become so heavy that they often cannot be transported over public roads because of highway load restrictions. In such cases a mast may have to occupy one trailer while the drawworks is carried by another trailer, with each trailer hauled by a different tractor. On the other hand, there are situations, such as on cross-country hauls or over desert roads, where the mast and drawworks could be carried on the same trailer, regardless of weight, thereby simplifying the transportation problem and materially reducing its cost.

It is among the objects of this invention to provide portable oil well drilling apparatus, in which a mast and drawworks are mounted on the same trailer and may be transported by it, and in which the drawworks can be raised from a low position on the trailer to a high position at the level of the floor of a tall substructure.

The preferred embodiment of the invention is illustrated in the accompanying drawings, in which:

FIGS. 4, 5 and 6 are vertical sections taken on the lines IV—IV, V—V, and VI—VI, respectively of FIG. 3;

FIG. 7 is a view of the rear end of the trailer; and

Figures 1, 2:
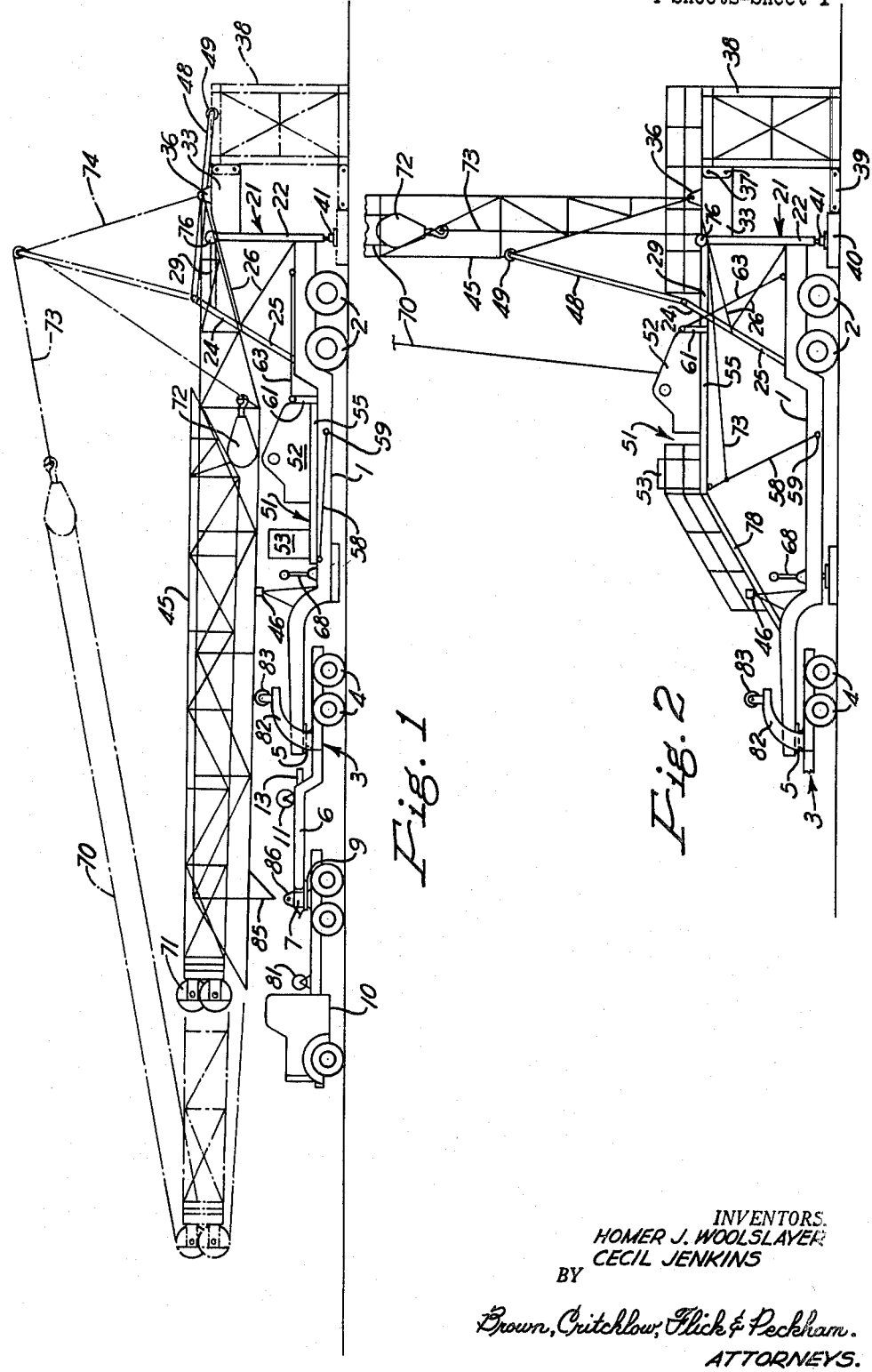
FIG. 1 is a side view of our drilling apparatus ready for hauling as a single unit.
FIG. 2 is a fragmentary side view showing the mast and drawworks in operative position.

Referring to FIG. 1 of the drawings, a semi-trailer base or frame 1, preferably with its central portion depressed to provide as low a center of gravity as possible, has its rear end supported by tandem wheels 2. The front end of the trailer frame is supported by a dolly 3 that likewise includes tandem wheels 4. The connection between the trailer and dolly may be by means of a fifth wheel 5, which may be mounted on either the dolly or the trailer without affecting this invention. It is shown mounted on the dolly with the king pin (not shown) extending down into it. The dolly includes a forwardly extending gooseneck 6, having at its front end a crosstree 7 provided with a central king pin (not shown) extending down into a fifth wheel 9 on the back of a tractor 10. Here again the fifth wheel and pin can be reversed if desired. The gooseneck may carry a wire line storage spool 11. It will be seen that the tractor pulls what amounts to two semitrailers arranged in tandem.

Rigidly mounted on the back of the trailer over its wheels 2 is a superstructure 21, which, as shown in FIGS. 3, 5, 6, 7 and 8, includes a row of vertical columns 22 and 23 across the back of the trailer, inclined columns 24 between inclined posts 25, in front of the vertical columns, side braces 26 connecting the tops of the posts with columns 22, braces 27 connecting the inclined columns, a cross beam 28 connecting the upper ends of the vertical columns, and box beams 29 extending rearwardly from the inclined columns and rigidly mounted on blocks 30 secured to the top of cross beam 28. Projecting rearwardly from columns 22 and cross beam 28 is a support for a rotary table 32, the support including parallel beams 33 and 34 connected at their outer ends by a rear beam 35. The rotary table is mounted on beams 34. Secured to the top of the side beams 33 are mast-receiving shoes 36. The rear end of the table support is adapted to be connected by removable pins 37 with a separate substructure 38 resting on the ground, as shown in FIG. 2. When that occurs, the bottom of the substructure may be connected by links 39 with pads 40 that support jacks 41 carried by the lower ends of vertical columns 22 in order to take the load off the trailer wheels.

Figure 3:
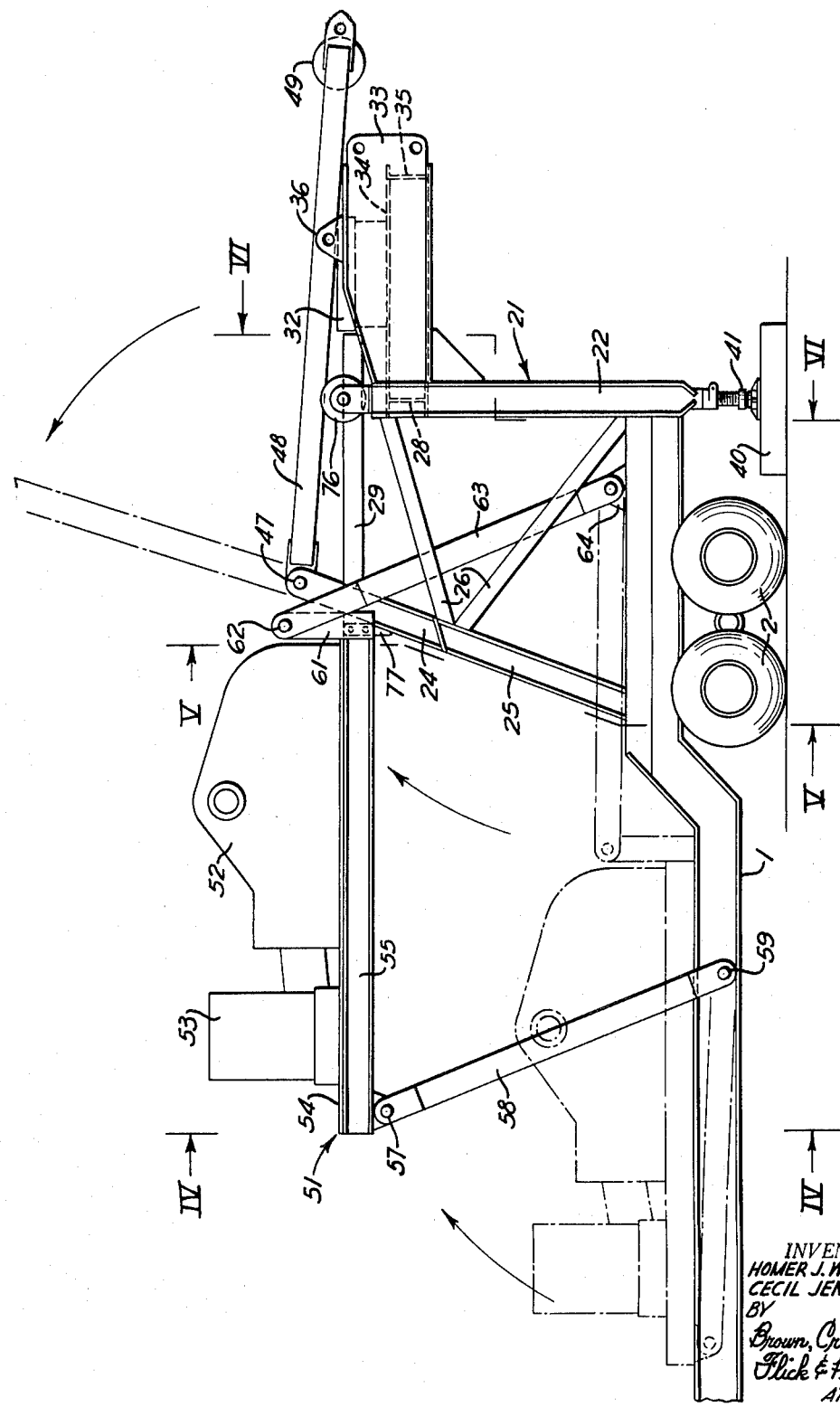
FIG. 3 is an enlarged fragementary side view of the trailer with the drawworks in its upper position.
Figure 8:
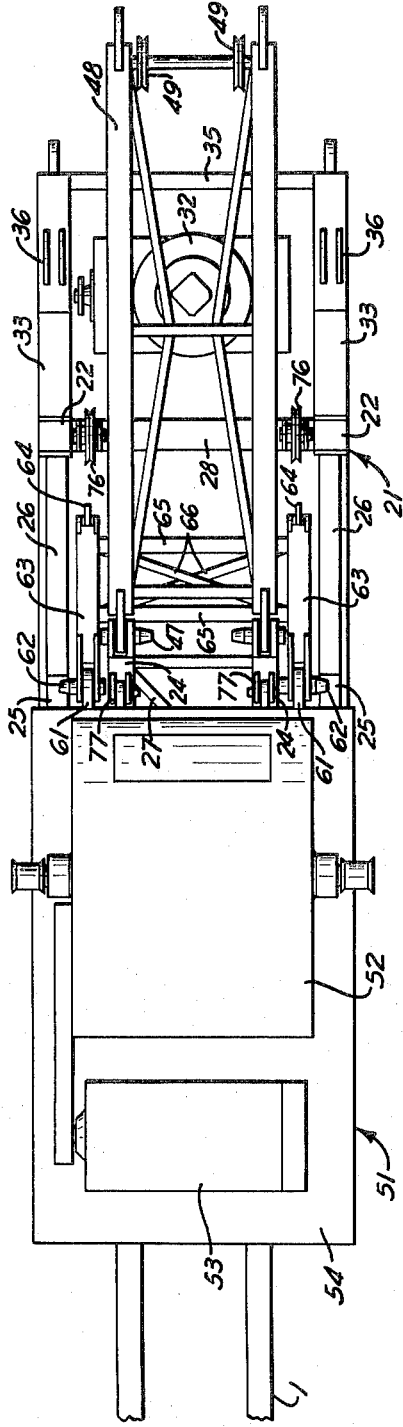
FIG. 8 is a fragmentary plan view of the trailer.

As shown in FIGS. 1 and 2, a reclining mast 45 has its feet pivotally mounted in shoes 36 and extends forward over the trailer and dolly. It will usually be a telescoped mast, in which the upper section extends through the major portion of the lower section in a well known manner. The mast is supported substantially horizontally by a central support 46 mounted on the trailer in front of its depressed central portion. Hinged by pins 47 to the upper ends of inclined columns 24, shown in FIGS. 3, 5 and 8, are the feet of a reclining gin pole 48 that extends backward therefrom across the rotary table and projects from the rear end of the trailer. The top or rear end of the gin pole is provided with a pair of sheaves 49. In this specification the front and back of the different elements are described relative to the front and back of the trailer.

Resting on the central part of the trailer frame during transportation is a drawworks unit 51, which includes a drawworks 52 and its operating engine 53 mounted on a floor 54 secured to a framework 55. As shown in FIGS. 3 and 4, the front end of the framework is pivotally connected by transverse pins 57 to the front or upper ends of a pair of guide links 58 that extend backward along the outside of the trailer frame and have their rear ends pivotally mounted on the projecting ends of a trunnion 59 extending through the frame. The rear end of the drawworks framework supports upwardly extending bars 61, the upper ends of which are connected by pivot pins 62 to the front or upper ends of a pair of guide links 63 that extend back over the trailer and have their rear ends pivotally connected to brackets 64 mounted on the trailer frame over the wheels. These two rear links are braced by suitable cross braces 65 and diagonal braces 66 to form a rigid unit as shown in FIGS. 5 and 6.

In FIG. 1 of the drawings the complete drilling rig is mounted on the trailer, which is attached to the dolly. The dolly is connected to the tractor for pulling the dolly and trailer as a unit. The parts shown in full lines are ready for transportation as a single load or, if the outfit has just arrived at a new drilling site, it is ready to be connected to a substructure. Before that is done, the jacks 41 at the back of the trailer are run down onto the pads 40 on the ground to take the load off the back wheels as shown in FIG. 2, and another jacking mechanism 68 directly in front of the drawworks unit is operated to press against the ground and thereby raise the trailer slightly to bear the weight of its front end. The rotary table support then is connected by pins 37 to substructure 38, which is also connected by links 39 to the rear pads 40.

The next step is to extend the mast forward, which may be done in any conventional manner. With the drilling line 70 strung on the crown block 71 and the traveling block 72, and with the fast line connected to drawworks 52, the traveling block is hooked onto a sling 73 that extends back and down around sheaves 49 at the rear end of the gin pole and then forward to the heel of the mast. By operating the drawworks, the traveling block will pull the sling and swing the gin pole up to its upper position after it has been pushed up above horizontal position, as shown in dotted lines in FIG. 1. The pole will be stopped in correct elevated position by a tension member 74. Continued operation of the drawworks will therefore cause the sling to swing the mast up in a well known manner toward and past the gin pole to an upright position, where it will be rigidly connected to the gin pole for support as shown in FIG. 2. If the effort required to raise the mast tends to lift the drawworks unit from the trailer frame, the drawworks should be bolted down to the trailer temporarily.

After the mast has been erected, the traveling block is lowered in the mast and sling 73 is disconnected from the mast and directed down around the back of a pair of sheaves 76 mounted on top of cross beam 28 of superstructure 21 on the trailer. From there the sling is extended forward and connected with the drawworks unit, preferably to front links 58 a short distance from their front ends. Upon operating the drawworks again, the traveling block is elevated to pull the sling up into the mast and thereby swing links 58 and 63 upward and back toward the superstructure as shown in FIG. 2. Of course, this will lift the drawworks unit. At the same time the pull of the drawworks on the fast line will help to lift the unit. The links are of such length and so arranged relative to each other that when the drawworks unit reaches its upper position its framework 55 will be horizontal. The rear end of the framework then is connected to brackets 77 projecting from inclined columns 24 as shown in FIGS. 3 and 5. This will hold the drawworks unit in its elevated position, but to brace it there a brace is inserted between the front end of its framework and the front portion of the trailer. A stairway 78 (FIG. 2) that is used for reaching the floor of the drawworks unit can be used as this brace. In its upper position, the drawworks floor is at the level of the superstructure and substructure floors, (not shown) in a position suitable for driving the rotary table.

Following completion of drilling, the erection steps recited above are reversed to lower the drawworks unit onto the trailer and to swing the mast and gin pole back down to their reclining positions. The rig is now ready to be taken to another location by tractor 10. However, if the weight of the load is too great for a single load on the road that must be traveled, the load can be split up between the dolly and the trailer. This is done by first disconnecting the feet of the mast from shoes 36, and then tilting down the front end of the reclining mast to rock it on central support 46 and shift it therefrom to a support on the dolly 3. The tilting can be accomplished by a short line connected to the mast above the tractor and extending down to a winch 81 on the tractor. The mast support on the dolly consists of two upwardly and rearwardly curved arms 82, the upper ends of which support rollers 83 that receive the lower legs of the mast. The reclining mast is provided with a pair of downwardly extending supports 85 that are pinned to brackets 86 on the opposite ends of the dolly cross tree 7 after the mast has been tilted onto rollers 83. Then the dolly can be pulled forward to remove it from the trailer so that the tractor and dolly can carry the mast alone to a new location. Another tractor can be connected to the front end of the trailer to haul it to the new location. Since the trailer carries only the drawworks unit and not the mast, it will not be too heavy for the road. At the new drilling site the transfer steps just recited may be reversed in order to disconnect the mast from the tractor and dolly and reconnect it to shoes 36 at the back of the trailer. The mast then can be erected as previously described.

It will be seen that with this apparatus a great deal of time and expense can be saved in rigging-up, taking down, and transportation from one location to another. The costs of such operations aften are a major expense in oil well drilling today, so the industry is greatly interested in anything that will reduce that expense. The apparatus disclosed herein can effect large savings.

According to the provisions of the patent statutes we have explained the principle of our invention and have illustrated and described what we now consider to represent its best embodiment. However, we desire to have it understood that, within the scope of the appended claims, the invention may be practiced otherwise than as specifically illustrated and described.

We claim:

1. Portable oil well drilling apparatus comprising a base, a gin pole extending above said base, an upright mast mounted at one side of the gin pole, means detachably connecting the upper end of the gin pole to the mast to hold the mast upright, and elevatable drawworks unit normally resting on said base at the opposite side of the gin pole, a crown block at the top of the mast, a traveling block inside the mast, a line supporting the traveling block from the crown block and extending from the latter down to the drawworks, a sling connected to the traveling block, means connecting the sling to said unit, whereby when the drawworks is operated to raise the traveling block in the mast to pull the sling said line and sling will lift the drawworks unit, means for guiding the upwardly moving unit to a predetermined elevated position, and detachable means for holding the unit in said position.

2. Portable oil well drilling apparatus comprising a trailer having front and rear ends, a superstructure rigidly mounted on the rear end of the trailer and including mast shoes and a rearwardly extending rotary table support, an upwardly extending gin pole hinged at its lower end to the front part of said superstructure, a drawworks unit normally resting on the trailer in front of the superstructure, front and rear links extending lengthwise of the trailer, means pivotally connecting the front ends of the links on a transverse axis to the front and rear ends of said unit respectively, means pivotally connecting the rear ends of the links on a transverse axis to the trailer at longitudinally spaced points, an upright mast mounted in said shoes, means detachably connecting the upper end of the gin pole to the mast to hold it upright, a crown block at the top of the mast, a traveling block inside the mast, a line supporting the traveling block from the crown block and extending from the latter down to the drawworks, sheaves mounted on said superstructure below the mast, a sling supported by the traveling block and extending down around the back of said sheaves and then forward to the drawworks unit, means connecting the sling to said unit, whereby when the drawworks is operated to raise the traveling block the line and sling will swing said unit upward and backward toward the superstructure to an elevated position, and means for detachably connecting the elevated unit to the superstructure.

3. Oil well drilling apparatus comprising a base having front and rear ends, an upright mast at one end of the base, front and rear reclining links extending lengthwise of the base, means pivotally connecting the ends of the links adjacent said mast on transverse axes to longitudinally spaced points on the base, an elevatable floor unit, means pivotally connecting the other ends of the links on transverse axes to said floor unit at longitudinally spaced points, drawworks mounted on said floor unit, a crown block at the top of the mast, a traveling block inside the mast, a line suspending the traveling block from the crown block and extending down from the latter to said drawworks, a sling connecting the traveling block with said floor unit, whereby when the drawworks is operated to raise the traveling block in the mast said line and sling will swing said floor unit and links upward and toward the mast to an elevated position, and means for securing the floor unit in said position adjacent the mast.

References Cited by the Examiner

UNITED STATES PATENTS 3,050,159  8/62  Paulson _____ 189/11
3,136,394  6/64  Woodslayer et al. _____ 189—1 X SAMUEL F. COLEMAN, *Primary Examiner.*